United States Patent Office 3,524,561
Patented Aug. 18, 1970

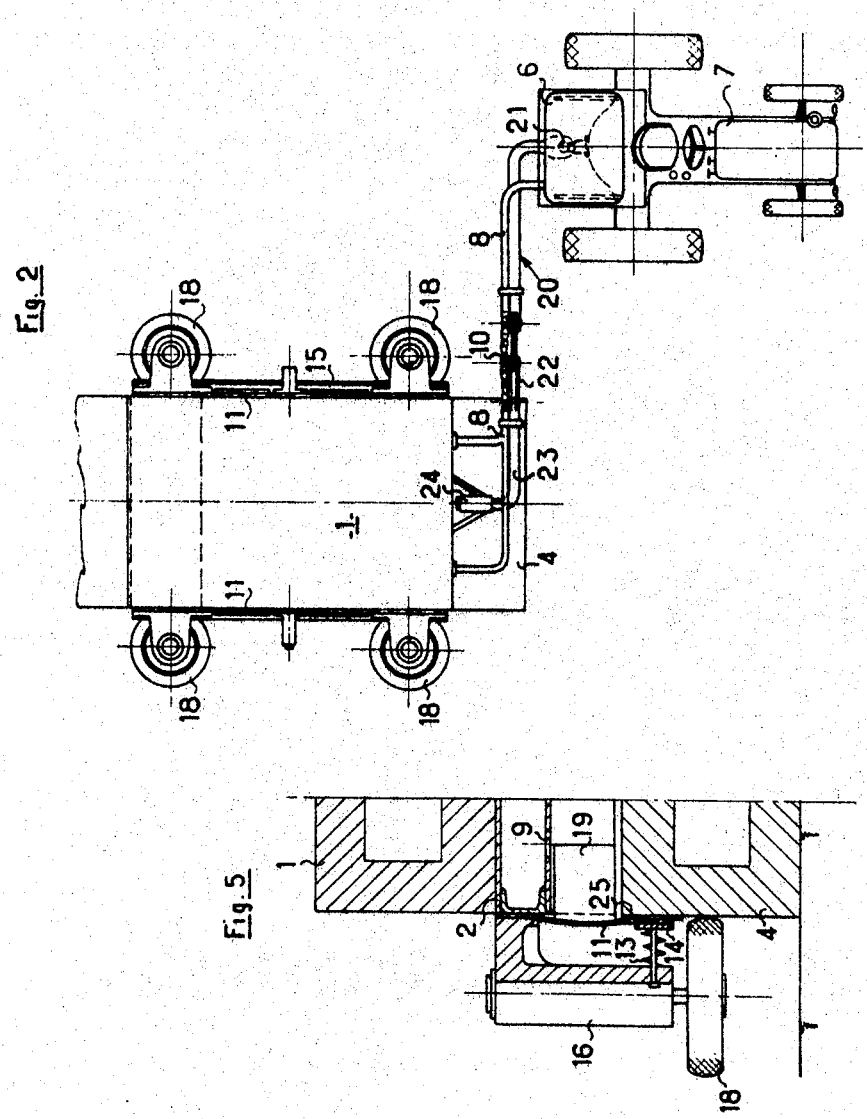

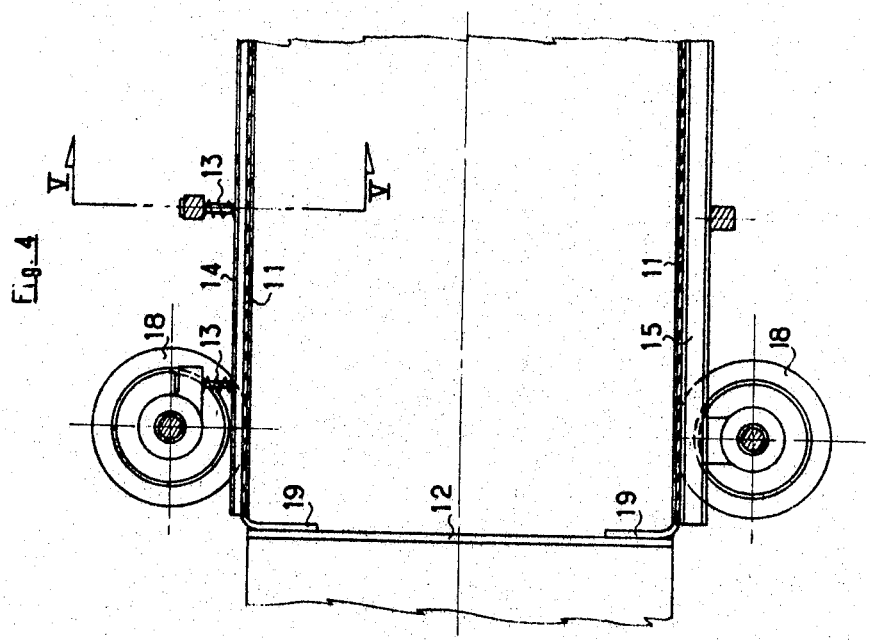
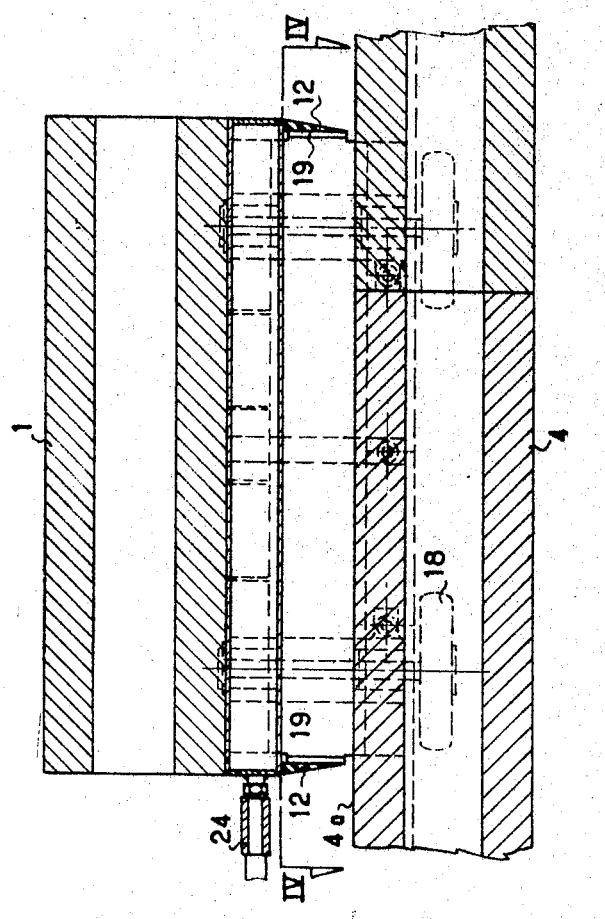

3,524,561
METHOD FOR CONVEYING HEAVY LOADS
Marie Michel Fernand Rene Renaudon, Boulogne, France, assignor to Bertin & Cie, Plaisir, France
Continuation of application Ser. No. 651,261, July 5, 1967. This application May 5, 1969, Ser. No. 822,058
Claims priority, application France, July 7, 1966
68,549
Int. Cl. B23p 19/00
U.S. Cl. 214—152                    4 Claims

ABSTRACT OF THE DISCLOSURE

A method and means for conveying heavy load elements such as track or channel or the like structural sections over an already laid section with the insertion of a fluid cushion between the element to be laid and said already laid structural section, while means are provided for guiding the element to be laid along said structural section. The fluid cushion is preferably confined, under the element to be laid or a chassis carrying the latter, within yielding transverse and longitudinal walls carried by the element to be laid and extending downwardly to enclose the cushion over the structural section already positioned.

---

This application is a continuation of application Ser. No. 651,261 filed July 5, 1967 and now abandoned.

The handling of heavy bulky loads over public works yards requires either the use of special versatile appliances capable of moving over any sort of unprepared ground or the prior construction of tracks or roads for the traffic of ordinary handling appliances. In any case, this substantially increases the work expenses.

One of the objects of the present invention is to avoid such inconveniences and to permit easy handling and delivery on site of heavy material, with relatively low expenses being involved.

Another object of this invention is to facilitate handling of prefabricated elements for the construction of lengthy structures such as tracks and channel systems.

Still another object of this invention is to take advantage of an already constructed section of such lengthy structures to be constructed, and use this section as a track for conveying above its elements.

A further object of the present invention is to resort to ground effect for conveying such elements along such already constructed section, in order to minimize load shifting and driving power requirements, this ground effect being obtained by the interposition of a pressure fluid cushion between said element and said section.

The load which is thus carried may be shifted towards its final location with a reduced expenditure of energy by means of a vehicle, of a winch or of driving wheels carried by the load or by the load-supporting chassis or platform or again the load may progress under the action of its own weight if the underlying section assumes a suitable slope. They source of fluid under pressure may advantageously be carried by the driving vehicle. The invention applies best to the handling of prefabricated elements of a track or of a channel system over a section thereof which has already been built. In the accompanying drawings:

FIG. 2 is a view of said arrangement as seen from above.

FIG. 3 is a vertical sectional view thereof through line III—III of FIG. 1.

FIG. 4 is a cross-sectional view through line IV—IV of FIG. 3.

FIG. 5 is a partial sectional view through line V—V of FIG. 4.

Figure 1:
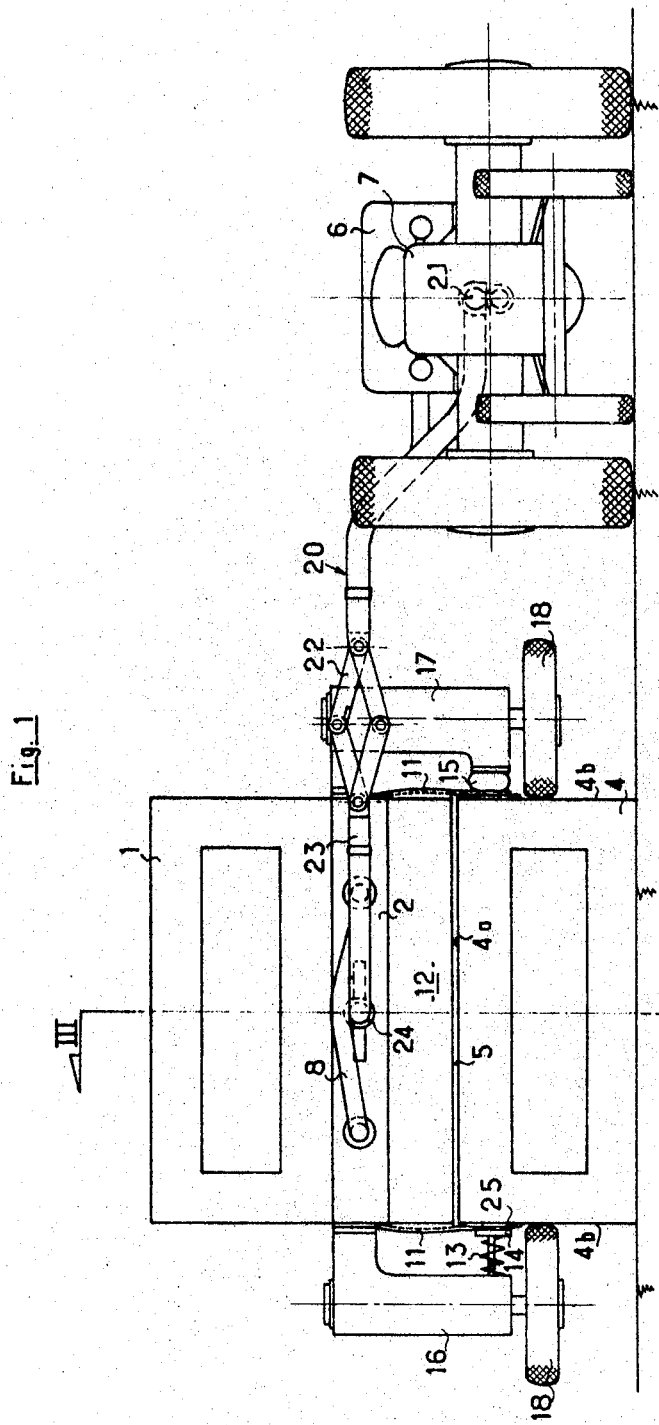
FIG. 1 is a front view of an arrangement according to the invention.

These drawings illustrate means for forming a channel system constituted by a succession of reinforced concrete elements. The elements 1 to be positioned rests on a hollow chassis 2 resting in its turn on the upper surface 4a of an already laid section 4 with the interposition of an air cushion 5.

The cushion 5 is fed with a compressed fluid supplied by a source 6 of said compressed fluid carried by a tractor 7, said being led to the cushion 5 along pipes 8 opening into the inside the chassis 2 through the discharge ports 9. The pipe 8 includes a yielding section 10 constituted by bellows for instance. Said cushion is confined laterally by yielding side walls 11 which are substantially parallel with the general direction of the section 4 and by transverse walls 12 which may be elastic. Said walls are fluid-tightly secured to the chassis 2 along their upper edges. The yielding walls 11 engage each the corresponding vertical surface 4b of the section 4 they are held in permanent sliding engagement with said surface means of either springs 13 registering with the walls 11 and acting on the latter with the interposition of a plate 14 extending preferably throughout the length of said walls or else an inflatable tube 15 or again any equivalent means such as jacks.

As illustrated in FIG. 5, it is possible to provide the walls 4b with a lining 25 of reduced coefficient of friction with reference to the material forming the walls 11. In order that the ends of the lateral walls 12 do not tuck up, they are rigidly secured either to the plates 14 against which the springs 13 or jacks bear or else to the inflatable tube 15. In the first case, the plate 14 is advantageously rigid with the corresponding springs or jacks.

The reaction of the springs, of the jacks or of the inflatable tube is transmitted to the chassis through rigid connections as illustrated at 16 and 17. Said connections may also carry guiding wheels 18 which may be used for propulsion.

As shown in FIG. 3, the transverse walls 12 may be given a bevelled shape with a narrow free edge facing the upper surface 4a of the section 4, said walls being sufficiently rigid so as not to be deformed by the pressure exerted by the fluid cushion. A daylight clearance separates said free edge of the transverse walls from the section 4.

The fluidtight connection between the transverse walls 12 and the side walls 11 (FIGS. 3, 4 and 5) is ensured by providing at each longitudinal end of each side wall a transverse extension 19 the height of which is substantially equal to that of the transverse walls 12 and which is urged against the inner surface of the latter by the pressure of the fluid cushion.

Transport of the load 1 on chassis 2 may be effected by a vehicle such as the tractor 7, or alternatively by jacks or winches or even by the mere weight of the means carrying the element 1 if section 4 slopes suitably in the forward direction.

In the embodiment illustrated, transport is effected by a tractor 7 drawing the chassis 2 through an offset linkage 20 secured to the tractor 7 by a ball-and-socket joint 21 (FIGS. 1 and 2) and comprising a parallel link motion 22 compensating any modifications in the transverse spacing between the chassis 2 and tractor 7. The arm 23 terminating the linkage 20 is, in such a case, rigid with the chassis 2. The system just described is operated as follows, assuming that a track, channel systems or like lengthy structure is to be made from prefabricated bulky elements such as 1 which are available at the origin or entrance terminal of the structure, a section 4 of which has already been constructed. The problem is therefore to transport these bulky elements 1 all the way from this entrance terminal to the end of the section 4 so as to deliver them on site.

By any conventional means such as a crane positioned permanently at the entrance terminal, an element 1 is loaded on the platform of the air-cushion carriage 2 which is movable over the already made section 4 and driven by the tractor 7 to the end of section 4 where the element is unloaded.

Because the weight of the load 1 is supported by the air cushion 5 and evenly spread out over the whole physical area it "wets" on section 4, the pressure on the latter is relatively small compared with what it would have been with a wheel carriage where the whole weight is concentrated on the restricted contact areas of the wheels. Therefore, section 4 made itself of elements such as 1 need not be of great strength and will not risk deformation or rupture as the loaded carriage moves over it.

Moreover, the weight of the load 1 is not supported to any practical extent by the tractor 7 which is therefore designed to support just its own weight. Also, the carriage 2 being in fact a tracked air cushion vehicle, the friction to be overcome during displacement is negligible, so that tractor 7 need not have a powerful engine.

To sum up, whereas load 1 may be very heavy and of very large size, its handling requires only a cheap lightweight low-power tractor 7 and no difficulty will be encountered even on loose ground such as mud or sand.

What is claimed is:

1. A process of constructing a structure of bulky structural elements exclusive of tracks normally used for transportation and having a widely exposed upper face, a section of said structure composed of such elements having previously been laid with the upper faces of said elements thereof forming a surface, wherein the improvement comprises the steps of:

sustaining one such structural element over said previously laid section at a first point thereof to overlie said surface upon a carrier, said carier being supported above said previously laid section by a pressure fluid cushion between said carrier and said surface to support fluidly said overlying element above said section whereby the load of said overlying element is evenly distributed over the cushion wetted area of said surface, driving said carrier supporting said fluid borne element from said first point to a distant second point of said previously laid section, by exerting on said element a propulsive thrust borne on a supporting means aside laid elements whereby to relieve the same of strain corresponding to said thrust and guiding said carrier while driving same by engaging opposed sides of said structural elements.

2. Process as claimed in claim 1, wherein said propulsive thrust is borne from the ground aside said previously laid section laterally thereof.

3. Process as claimed in claim 2, wherein said fluid borne element is driven by progressing on the ground alongside said previously laid section.

4. Process as claimed in claim 1, wherein said structure is a channel system and said structural elements are portions thereof.

References Cited

UNITED STATES PATENTS

| | | | |
|---|---|---|---|
| 2,853,956 | 9/1958 | Wenner-Gren et al. | |
| 3,055,312 | 9/1962 | Jay et al. | 104—134 |
| 3,064,827 | 11/1962 | Bostock et al. | |
| 3,124,209 | 3/1964 | Flipse. | |
| 3,190,235 | 6/1965 | Bertin et al. | |
| 3,204,715 | 9/1965 | Maloof. | |
| 3,282,359 | 11/1966 | Satterfield. | |
| 3,339,656 | 9/1967 | Blonsky | 180—119 |
| 1,821,340 | 9/1931 | Guilbert et al. | 104—3 |
| 2,696,791 | 12/1954 | Boulard | 104—3 |
| 3,283,926 | 11/1966 | Eckhardt | 104—3 X |

FOREIGN PATENTS 952,771   3/1964   Great Britain.

GERALD M. FORLENZA, Primary Examiner

R. J. SPAR, Assistant Examiner

U.S. Cl. X.R.

29—429, 469; 104—3, 23, 134; 105—144; 214—1